United States Patent
Kosuge et al.

(10) Patent No.: US 7,610,515 B2
(45) Date of Patent: Oct. 27, 2009

(54) DISK ARRAY DEVICE AND FAILURE RESPONSE VERIFICATION METHOD THEREOF

(75) Inventors: Shoichi Kosuge, Odawara (JP); Takahiro Itto, Odawara (JP); Akiyori Tamura, Kaisei (JP); Koichi Okada, Odawara (JP)

(73) Assignee: Hitachi, Ltd., Tokyo (JP)

( * ) Notice: Subject to any disclaimer, the term of this patent is extended or adjusted under 35 U.S.C. 154(b) by 503 days.

(21) Appl. No.: 11/304,896

(22) Filed: Dec. 16, 2005

(65) Prior Publication Data

US 2007/0101199 A1     May 3, 2007

(30) Foreign Application Priority Data

Oct. 27, 2005    (JP)  ............................. 2005-313499

(51) Int. Cl.
     *G06F 11/00*      (2006.01)
(52) U.S. Cl. ....................................................... 714/41
(58) Field of Classification Search ................... 714/32, 714/42, 41
See application file for complete search history.

(56) References Cited

U.S. PATENT DOCUMENTS

| | | | | |
|---|---|---|---|---|
| 5,574,855 A | * | 11/1996 | Rosich et al. | ........ 714/41 |
| 5,862,362 A | * | 1/1999 | Somasegar et al. | ........ 703/21 |
| 7,386,762 B1 | * | 6/2008 | Schoenthal et al. | ........ 714/41 |
| 7,467,333 B2 | * | 12/2008 | Keeton et al. | ........ 714/41 |
| 2002/0091506 A1 | * | 7/2002 | Gruber | ........ 703/19 |
| 2003/0172321 A1 | * | 9/2003 | Wolin et al. | ........ 714/41 |
| 2007/0050686 A1 | * | 3/2007 | Keeton et al. | ........ 714/48 |

FOREIGN PATENT DOCUMENTS

JP      2002-132534      10/2000

* cited by examiner

*Primary Examiner*—Scott T Baderman
*Assistant Examiner*—Yair Leibovich
(74) *Attorney, Agent, or Firm*—Stites & Harbison PLLC; Juan Carlos A. Marquez, Esq.

(57) ABSTRACT

This disk array device having at least one volume that reads and writes data based on an access request transmitted from a client device via a server device, includes: a failure generation unit for generating a simulated failure in one's own device; an access request transmission unit for transmitting the access request transmitted from the client device to the server device; and a verification unit for verifying the setting of the server device regarding the response to the failure based on the response of the server to the access request transmitted from the access request transmission unit in a state of where the failure is being generated with the failure generation unit.

20 Claims, 15 Drawing Sheets

FIG.3

| SERVER ID | IP ADDRESS | SERVER-USE DIRECTORY | CLIENT-USE DIRECTORY |
|---|---|---|---|
| S1 | xxx.xxx.xxx.xxx | /xxx | /aaa |
| S2 | yyy.yyy.yyy.yyy | /yyy | /bbb |
| S3 | zzz.zzz.zzz.zzz | /zzz | /ccc |

FIG.4

| FAILURE ID | FAILURE | FAILURE STATUS | FAILURE OCCURRENCE TIME OR INTERVAL | USED FAILURE DATA |
|---|---|---|---|---|
| A1 | LINKDOWN FAILURE | CONTINUOUS | qq | - |
| A2 | LINKDOWN FAILURE | INTERMITTENT | rr | - |
| A3 | PRIMARY-SIDE LINKDOWN FAILURE | CONTINUOUS | ss | - |
| B1 | COMMAND SUBDUCTION | CONTINUOUS | hh | - |
| B2 | ERROR RESPONSE | - | - | - |
| C1 | TRANSMISSION FRAME FAILURE | - | - | vvvvv |
| D1 | UNAUTHORIZED USE OF DATA | - | - | wwwww |

FIG.5

| TEST SCHEDULE ID | PRIMARY-SIDE I/F ADDRESS | ALTERNATE-SIDE I/F ADDESS | USED SERVER ID | USED LUN | TEST SCHEDULE | TIME REQUIRED |
|---|---|---|---|---|---|---|
| I1 | dddddddd | eeeeeeee | S1 | j | A1.A2.A3.B1.C1 | m |
| I2 | dddddddd | eeeeeeee | S2 | k | A1.A2.A3 | n |
| I3 | dddddddd | eeeeeeee | S3 | l | B1.C1.D1 | p |

FIG.13

TEST CONTROL EXECUTION STATUS DISPLAY FORM

| | |
|---|---|
| SERVER ID | S1 |
| CLIENT -USE DIRECTORY | /aaa |
| USED-LUN | j |
| TEST SCHEDULE | A1.A2.A3.B1.C1 |
| TIME REQUIRED | m |

| | |
|---|---|
| A1 | NORMAL END |
| A2 | NORMAL END |
| A3 | IN EXECUTION |
| B1 | UNEXECUTED |
| C1 | UNEXECUTED |

CANCEL

FIG.14

TEST CONTROL EXECUTION STATUS DISPLAY FORM

| | |
|---|---|
| SERVER ID | S1 |
| CLIENT -USE DIRECTORY | /aaa |
| USED-LUN | j |
| TEST SCHEDULE | A1.A2.A3.B1.C1 |
| TIME REQUIRED | m |

| | |
|---|---|
| A1 | NORMAL END |
| A2 | NORMAL END |
| A3 | NORMAL END |
| B1 | NORMAL END |
| C1 | NORMAL END |

[LOG OUTPUT] [END]

FIG.15

```
Sep 20 9:08:10 A1 luxx start
Sep 20 9:08:10 A1 luxx portx link down
Sep 20 9:08:11 A1 luxx command : write : xxxxxx
Sep 20 9:09:10 A1 luxx portx link up
Sep 20 9:09:11 A1 luxx command : write : xxxxxx successful
Sep 20 9:09:11 A1 luxx normal end
```
} L1

```
Sep 20 9:10:10 A2 luxx start
Sep 20 9:10:10 A2 luxx portx intermittent link down
Sep 20 9:10:11 A2 luxx command : write : xxxxxx
Sep 20 9:10:16 A2 luxx command : write : xxxxxx successful
Sep 20 9:10:18 A2 luxx portx link up
Sep 20 9:10:18 A2 luxx normal end
```
} L2

```
Sep 20 9:20:00 A3 luxx start
Sep 20 9:20:00 A3 luxx portx link down
Sep 20 9:20:05 A3 luxx command : write : xxxxxx through porty
Sep 20 9:20:06 A3 luxx command : write : xxxxxx successful
Sep 20 9:20:10 A3 luxx portx link up
Sep 20 9:20:10 A3 luxx normal end
```
} L3

```
Sep 20 10:18:10 B1 luxx start
Sep 20 10:19:10 B1 luxx response delay set
Sep 20 10:18:11 B1 luxx command : write : xxxxxx
Sep 20 10:18:42 B1 luxx command : write : xxxxxx successful
Sep 20 10:19:00 B1 luxx response delay reset
Sep 20 10:19:10 B1 luxx normal end
```
} L4

```
Sep 20 10:30:10 C1 luxx start
Sep 20 10:30:10 C1 luxx flame data uncorrectable error reply
              xxxx xxxx xxxx xxxx xxxx xxxx xxxx xxxx
              xxxx xxxx xxxx xxxx xxxx xxxx xxxx xxxx
Sep 20 10:30:20 C1 request status flame reply
Sep 20 10:30:30 C1 luxx normal end
```
} L5

131

DISK ARRAY DEVICE AND FAILURE RESPONSE VERIFICATION METHOD THEREOF

CROSS-REFERENCES TO RELATED APPLICATIONS

This application relates to and claims priority from Japanese Patent Application No. 2005-313499, filed on Oct. 27, 2005, the entire disclosure of which is incorporated herein by reference.

BACKGROUND OF THE INVENTION

The present invention generally relates to a disk array device and a failure response verification method thereof, and in particular relates to a disk array device suitable for reading and writing data based on an access request transmitted from a client device via a server device.

Conventionally, a storage system which, by connecting a server device, which is connected to a plurality of client devices, and a disk array device, transmits an access request from the client device to the disk array device via the server device, stores the data in a physical disk of the disk array device according to the access request, or reads the data from such physical disk is becoming widely prevalent.

Here, with this storage system, in order to verify the connectability between the setting server device and disk array device or the setting regarding the response or path switching upon a failure, for instance, a maintenance worker had to verify the setting of the server device and disk array device by inserting and removing the path or the like and generating a simulated failure.

In order to overcome the foregoing problems, Japanese Patent Application No. 2002-132534 proposes an input/output test system having a simulated storage apparatus (disk array device) for executing simulated storage operations of an external storage apparatus, an information processing device (server device) for evaluating the results of the simulated operation performed by this simulated storage apparatus, a simulated item communication means for transmitting and receiving the simulated item corresponding to the simulated operation and the result of such simulated operation between the simulated storage apparatus and information processing device, and an actual data communication means for transmitting and receiving the actual data actually input and output to and from the external storage apparatus between the simulated storage apparatus and information processing device, wherein the simulated item communication means and actual data communication means operate in a mutually independent manner.

SUMMARY OF THE INVENTION

Incidentally, with this kind of input/output test system described above, since the information processing device is in charge of confirming the operation, it is necessary to provide a simulated item communication means for transmitting and receiving information concerning the simulated operation to be conducted by the simulated storage apparatus between the information processing device and the simulated storage apparatus.

Further, with the input/output test system described above, since troublesome procedures of having to install a test program in each information processing device will become required, and since testing is conducted with the simulated storage apparatus, there is a problem in that the verification cannot be conducted in the actual environment of the storage system.

The present invention was devised in view of the foregoing points, and an object thereof is to provide a disk array device and a failure response verification method thereof capable of easily verifying the setting of a server device regarding the response to a failure.

In order to achieve the foregoing object, the present invention provides a disk array device having at least one volume that reads and writes data based on an access request transmitted from a client device via a server device, including: a failure generation unit for generating a simulated failure in one's own device; an access request transmission unit for transmitting the access request transmitted from the client device to the server device; and a verification unit for verifying the setting of the server device regarding the response to the failure based on the response of the server to the access request transmitted from the access request transmission unit in a state of where the failure is being generated with the failure generation unit.

Accordingly, without having to install any new test program in the server device, it will be possible to verify the setting of the server device regarding the response to a failure, and to verify the setting of the server device regarding the response to a failure in the actual network environment.

Further, the present invention also provides a failure response verification method of a disk array device having at least one volume that reads and writes data based on an access request transmitted from a client device via a server device, including: a first step of generating a simulated failure in one's own device; a second step of transmitting the access request transmitted from the client device to the server device; and a third step of verifying the setting of the server device regarding the response to the failure based on the response of the server to the access request transmitted at the second step in a state of where the failure is being generated at the first step.

Accordingly, without having to install any new test program in the server device, it will be possible to verify the setting of the server device regarding the response to a failure, and to verify the setting of the server device regarding the response to a failure in the actual network environment.

According to the present invention, by generating a simulated failure in one's own device, transmitting to a server device an access request transmitted from a client device, and verifying the setting of the server device regarding the response to a failure in a state when such failure is being generated, without having to install any new test program in the server device, it will be possible to verify the setting of the server device regarding the response to a failure, and to verify the setting of the server device regarding the response to a failure in the actual network environment. Thus, a disk array device and a failure response verification method thereof capable of easily verifying the setting of a server device regarding the response to a failure can be realized thereby.

BRIEF DESCRIPTION OF THE DRAWINGS

FIG. 3 is a conceptual diagram for explaining a server information storage table;

FIG. 4 is a conceptual diagram for explaining a failure information storage table;

FIG. 5 is a conceptual diagram for explaining a test schedule storage table;

FIG. 13 is a conceptual diagram for explaining the test processing execution status display form;

FIG. 14 is a conceptual diagram for explaining the test processing execution status display form; and FIG. 15 is a conceptual diagram for explaining the log output screen.

DETAILED DESCRIPTION OF THE INVENTION

An embodiment of the present invention is now explained in detail with reference to the drawings.

(1) Configuration of Storage System According to Present Embodiment

Figure 1:
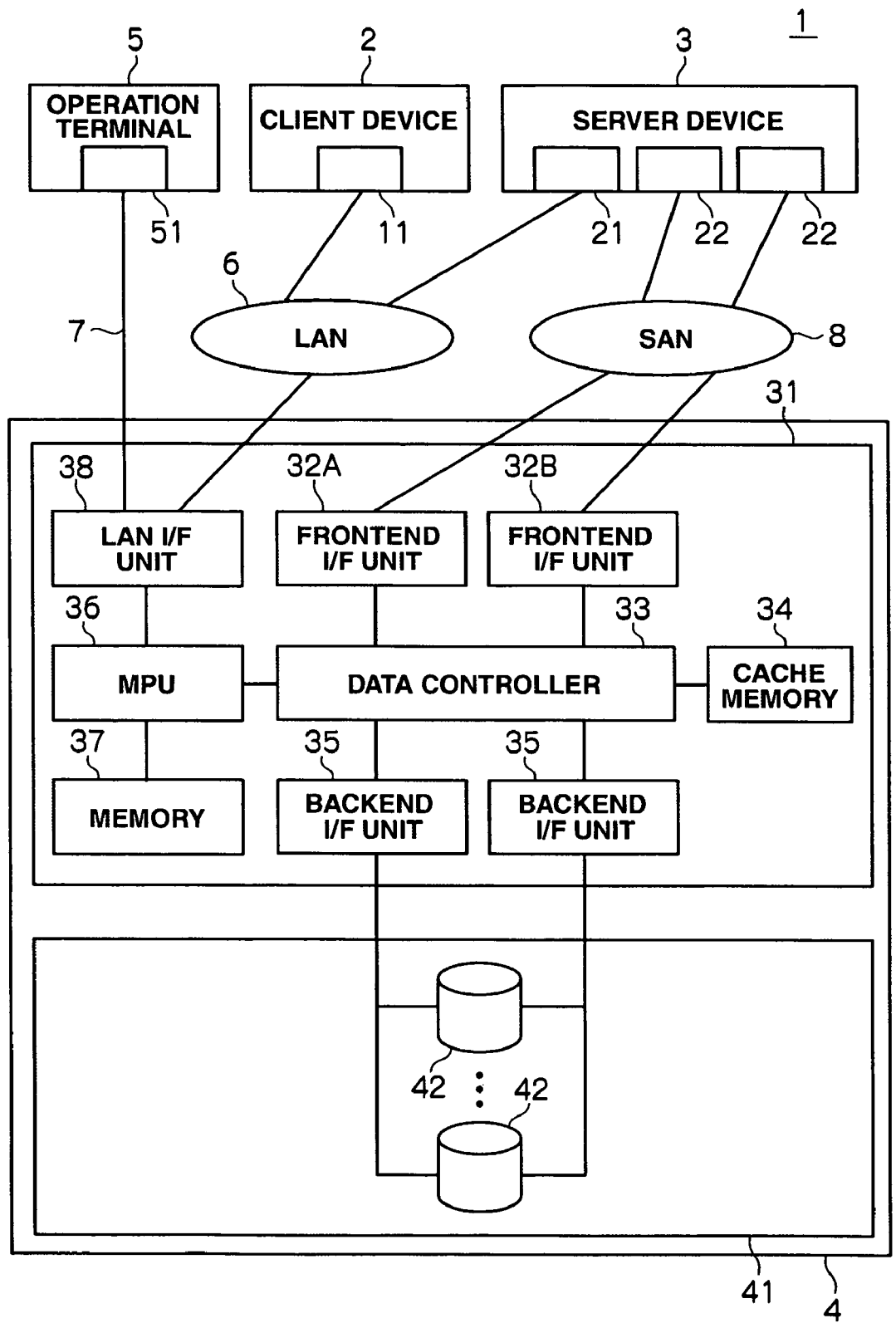
FIG. 1 is a schematic diagram showing the configuration of a storage system according to the present embodiment.

FIG. 1 shows the system configuration of a storage system 1 according to the present embodiment. This storage system 1 has a client device 2, a server device 3, a disk array device 4 and an operation terminal 5.

Here, this storage system 1 is configured by the client device 2, server device 3 and disk array device 4 being connected via a LAN (Local Area Network) 6, the disk array device 4 and operation terminal 5 being connected via the LAN 7, and the server device 3 and disk array device 4 being connected via a SAN (Storage Area Network) 8.

Incidentally, with this storage system 1, although a case is explained where the LAN 6 and LAN 7 are configured separately, the present invention is not limited thereto, and, for instance, these may be configured from a single LAN, and the client device 2, server device 3, disk array device 4 and operation terminal 5 may be configured from a single SAN, and may be broadly employed in a variety of network configurations upon applying a corresponding interface and protocol.

The client device 2, for instance, has a CPU (Central Processing Unit), memory and so on not shown, and further has an operating unit, display unit and so on not shown, and, specifically, is configured from a personal computer, mainframe computer or the like. Further, the client device 2, for example, is equipped with a LAN I/F unit 11 for accessing the server device 3 via the LAN 6. Incidentally, in the present embodiment, although a case is explained where a single client device 2 is connected for the ease of explanation in the drawings, the present invention is not limited thereto, and a plurality of client devices 2 may be connected to the server device 3 via the LAN 6.

The server device 3, for instance, has a CPU, memory and so on not shown, and further has an operating unit, display unit and so on not shown, and, specifically, is configured from a workstation or the like. Further, the server device 3 is equipped with, for example, a LAN I/F unit 21 for accessing the client device 2 via the LAN 6, and a client bus adapter (Host Bus Adapter) 22 for accessing the disk array device 4 via the SAN 8.

The server device 3 is capable of presenting to the client device 2, which was subject to mount processing, data in the corresponding directory of the server device 3. Incidentally, in the present embodiment, although a case is explained where a single server device 3 is connected for the ease of explanation in the drawings, the present invention is not limited thereto, and a plurality of server devices 3 may be connected to the disk array device 4 via the SAN 8.

The disk array device 4 is configured by including a disk controller 31, and a storage unit 41 having a plurality of physical disks 42. Here, the disk controller 31 is configured by including a frontend I/F unit 32, a data controller 33, a cache memory 34, a backend I/F unit 35, a MPU 36, a memory 37 and a LAN I/F unit 38.

The frontend I/F unit 32 has a prescribed communication interface for communicating with the server device 3, and is assigned a network address (e.g., MAC (Media Access Control) address or WWN (World Wide Name), IP (Internet Protocol) address) and so on for identifying the respective units.

Further, in order to improve the reliability, the frontend I/F unit 32 is configured from a primary-side front end I/F unit 32A and an alternate-side front end I/F unit 32B, and normally transmits and receives access requests and data via the primary-side front end I/F unit 32A on the one hand, and transmits and receives access requests and data via the alternate-side front end I/F unit 32B on the other hand when a failure occurs in the primary-side front end I/F unit 32A.

The data controller 33, for instance, is configured from switch such as a crossbar switch or bus for performing data transfer by high-speed switching, and is connected to the frontend I/F unit 32, backend I/F unit 35, cache memory 34 and MPU 36, and transfers access requests and data among the frontend I/F unit 32, backend I/F unit 35, cache memory 34 and MPU 36.

The cache memory 34, for example, is configured from an involatile memory, and is used for temporarily storing data to be read from and written into the physical disk 42 of the storage unit 41.

The backend I/F unit 35 has a prescribed communication interface for communicating with the physical disk 42 of the storage unit 41, and transmits data read from the cache memory 34 to the storage unit 41 on the one hand, and receives data read from the physical disk 42 of the storage unit 41 on the other hand. Further, the backend I/F unit 35 is configured redundantly in order to improve the reliability.

The MPU 36 controls the frontend I/F unit 32, backend I/F unit 35 and data controller 33 based on various control programs stored in an internal memory not shown. In other words, the MPU 36 executes the reading of data retained in the cache memory 34 according to the access request received in the frontend I/F unit 32, and the writing and reading of such data in and from the physical disk 42.

Here, the MPU 36 is capable of controlling the physical disk 42 according to a RAID level (e.g., RAID 1, RAID 5) prescribed with a so-called RAID (Redundant Array of Inexpensive Disks) system.

In other words, with this MPU 36, by combining a plurality of physical disks 42, for example, a group (RAID group) operated under the RAID system is configured, and the [MPU 36] is able to set one or more logical volumes (these are hereinafter referred to as "logical volumes") on the storage area provided by this group.

The memory 37, for example, is configured from an involatile memory, and stores management information for managing data stored in the physical disk 42 based on a RAID level, and control information to be used by a program or the like.

The LAN I/F unit 38 has a prescribed communication interface for communicating with the operation terminal 5 and server device 3, and transmits display data and the like to be used in the operation of the operation terminal 5 on the one hand, and receives operation data and the like transmitted from the operation terminal 5 on the other hand.

The storage unit 41 is configured from a plurality of physical disks 42 arranged in an array. This physical disk 42, for example, is configured from an ATA (Advanced Technology Attachment) hard disk, a SATA (Serial-ATA) hard disk, a SCSI (Small Computer System Interface) hard disk, a SAS (Serial Attached SCSI) hard disk, a fibre channel hard disk or the like.

The operation terminal 5 is a terminal device for maintaining or managing the disk array device 4 including a LAN I/F unit 51 for accessing the disk array device 4 via the LAN 7, and, for instance, is a general personal computer including a CPU, memory and so on not shown, and an operating unit, display unit and so on not shown. The maintenance worker of the operation terminal 5, by operating the operation terminal 5, for example, will be able to set a logical volume defined on the physical disk 42, add or remove the physical disk 42, change the setting of the RAID configuration (e.g., change the setting from RAID level 5 to RAID level 1), and so on.

Here, the flow of input and output of data in the storage system 1 is explained. With this storage system 1, the access request transmitted from the client device 2 sequentially via the LAN 6, server device 3 and SAN 8 is provided to the MPU 36 sequentially via the frontend I/F unit 32 and data controller 33.

When the MPU 36 is given the access request of a data write request from the client device 2 sequentially via the LAN 6, server device 3 and SAN 8, it stores the data to be written corresponding to the data write request also transmitted from the client device 2 sequentially via the LAN 6, server device 3 and SAN 8 in the cache memory 34 sequentially via the frontend I/F unit 32 and data controller 33.

Further, the MPU 36 reads the data to be written stored in the cache memory 34, and writes this in the address position of the corresponding physical disk 42 in the storage unit 41 via the backend I/F unit 35.

Meanwhile, when the MPU 36 is given the access request of a data read request, it reads the data to be written from the address position of the corresponding physical disk 42 of the storage unit 41 according to the data read request, and stores this in the cache memory 34 sequentially via the backend I/F unit 35 and data controller 33.

Then, the MPU 36 reads the data to be read stored in the cache memory 34, and transmits this to the client device 2 sequentially via the data controller 33, frontend I/F unit 32, SAN 8, server device 3 and LAN 6.

Incidentally, in the present embodiment, although a case is explained where a single disk controller 31 is provided in the disk array device 4, the present invention is not limited thereto, and two or more [disk controllers 31] may be provided in order to improve the reliability, and, in such a case, the disk controllers 31 may be connected with a connection path or the like.

(1-2) Failure Response Verification Processing

Next, the method relating to the failure response verification processing to be performed in the storage system 1 is explained with reference to FIG. 2 to FIG. 11. With the storage system 1 according to the present embodiment, a simulated failure is generated in the disk array device 4, an access request to be transmitted by the client device 2 is created and transmitted to the server device 3 via the LAN 6, and the setting of the server device regarding the response to a failure is verified based on the response of the server device 3 to the access request in a state such simulated failure is being generated.

Figure 2:
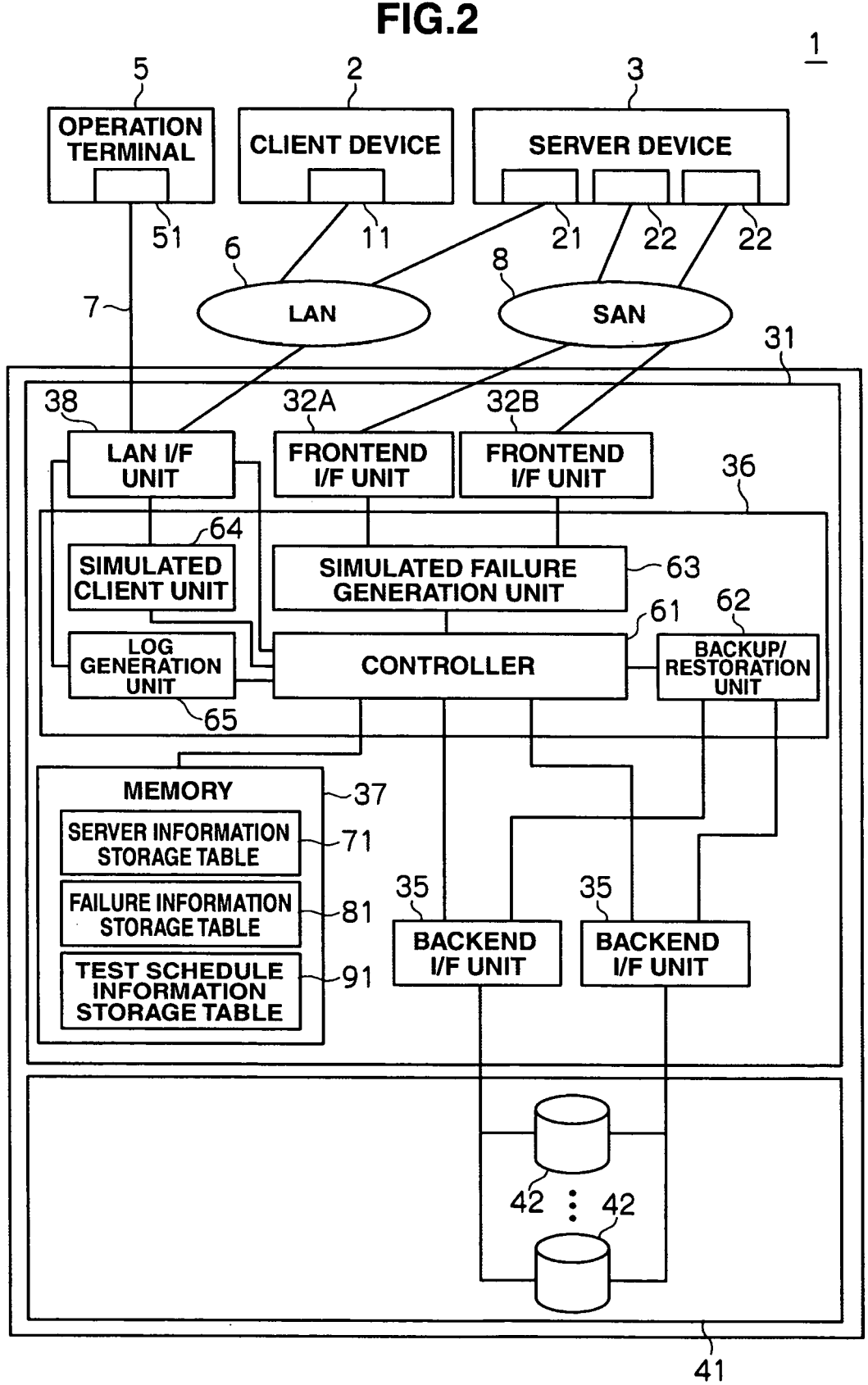
FIG. 2 is a schematic diagram showing the configuration of a storage system according to the present embodiment.

FIG. 2 shows a configuration schematically representing the function regarding the MPU 36 of the disk controller 31 for executing the failure response verification processing. Here, the MPU 36 of the disk controller 31 is configured by including a control unit 61 for performing the overall control in the failure response verification processing, a backup/restoration unit 62 for performing the backup processing and restoration processing of the logical volume used in this processing, a simulated failure generation unit 63 for generating a simulated failure in this processing, a simulated client unit 64 for transmitting the access request and data transmitted by the client device 2, and a log creation unit 65 for creating a log and determination result in this processing.

Incidentally, the control unit 61, backup/restoration unit 62, simulated failure generation unit 63, simulated client unit 64 and log creation unit 65 are software realized by various control programs stored in the memory 37 being deployed in the internal memory (not shown) of the MPU 36, and the MPU 36 executing such control programs.

Further, the memory 37 of the disk controller 31 stores a server information storage table 71 storing information of the server device 3 connected to the disk array device 4, a failure information storage table 81 storing information of simulated failures, and a test schedule information storage table 91 storing a test schedule which is information regarding which failure among the failures should be generated in what sequence for conducting the test.

The server information storage table 71, as shown in FIG. 3, is configured from a server ID storage column 72 storing a server ID for identifying the server device 3, an IP address storage column 73 storing information of the IP address of the server device 3, a server-use directory storage column 74 storing information of the directory in the server device 3 when using the logical volume of the disk array device 4, and a client-use directory storage column 75 storing information of the directory in the client device 2 when using the directory of the server device 3.

The failure information storage table 81, as shown in FIG. 4, is configured from a failure ID storage column 82 storing a failure ID for identifying the failure, a failure storage column 83 storing specific information on the failures to be simulated, a failure status storage column 84 storing information on the generation status of the failure, a failure generation time or interval storage column 85 storing the time of generating the failure or the interval of generating the failure, and a used failure data storage column 86 storing failure data to be used upon generating a failure.

The test schedule information storage table 91, as shown in FIG. 5, is configured from a test schedule ID storage column 92 storing a test schedule ID for identifying the test schedule, a primary-side I/F address storage column 93 storing the network address of the primary-side front end I/F unit 32A, an alternate-side I/F address storage column 94 storing the network address of the alternate-side front end I/F unit 32B, a used server ID storage column 95 storing the server ID of the server device 3 to be used, a used LUN storage column 96 storing the LUN (Logical Unit Number) of the logical volume to be used, a test schedule storage column 97 storing the test schedule, and a time required storage column 98 storing the time required in the test schedule.

Here, the flow of input and output of data upon performing the failure response verification processing in the storage system 1 is explained. With this storage system 1, a test processing execution request is given from the operation terminal 5 to the control unit 61 of the MPU 36 sequentially via the LAN 7 and LAN I/F unit 38.

When writing data, the control unit 61 controls the simulated client unit 64 so as to create an access request of a data write request, read the test data to be written corresponding to the data write request stored in the memory 37, and transmit the data write request and data to be written to the service device 3 sequentially via the LAN I/F unit 38 and LAN 6.

Further, when the control unit 61 is given a data write request from the server device 3 sequentially via the SAN 8, frontend I/F unit 32 and data controller 33, it similarly stores the data to be written corresponding to the data write request transmitted from the server device 3 in the cache memory 34 (FIG. 1) sequentially via the frontend I/F unit 32 and data controller 33 (FIG. 1).

Further, the control unit 61 reads the data to be written stored in the cache memory 34 (FIG. 1), and writes this in the address position of the corresponding physical disk 42 in the storage unit 41 via the backend I/F unit 35.

Meanwhile, when reading data, the control unit 61 controls the simulated client unit 64 to create an access request of a data read request, and transmit the data read request to the server device 3 sequentially via the LAN I/F unit 38 and LAN 6.

Further, when the control unit 61 is given a data read request from the server device 3 sequentially via the frontend I/F unit 32 and data controller 33, it reads the data to be read from the address position of the corresponding physical disk 42 in the storage unit 41 according to the data read request, and stores this in the cache memory (FIG. 1) sequentially via the backend I/F unit 35 and data controller 33 (FIG. 1).

Further, the control unit 61 reads the data to be read stored in the cache memory 34 (FIG. 1), and transmits this to the server device 3 sequentially via the data controller 33 (FIG. 1), frontend I/F unit 32 and SAN 8. And, the control unit 61 receives this data to be read, which was transmitted to the server device, from the server device 3 in the simulated client unit 64 sequentially via the LAN 6 and LAN I/F unit 38.

(1-3) Failure Response Verification Processing Sequence

Figure 6:
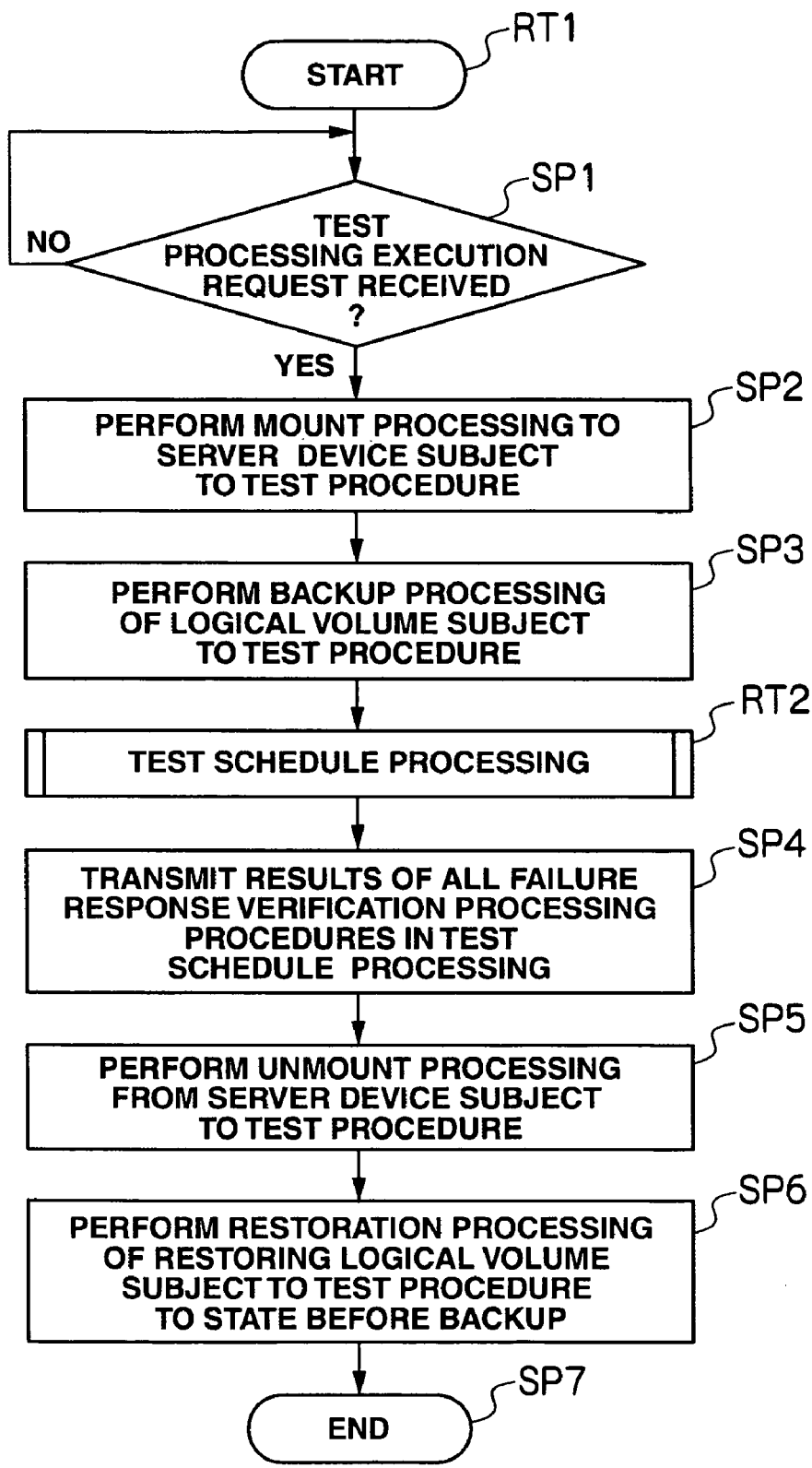
FIG. 6 is a flowchart for explaining the test processing sequence.

Next, the failure response verification processing sequence to be performed in the storage system 1 is explained. FIG. 6 is a flowchart showing the specific processing sequence of the test processing for generating a simulated failure, creating an access request transmitted by the client device 2 and transmitting it to the server device 3 via the LAN 6, and verifying the setting of the server device 3 regarding the response to the failure based on the response of the server device 3 to the access request in a state where the simulated failure is being generated.

The control unit 61, at the initial stage, waits in standby mode to receive the test processing execution request from the operation terminal 5 sequentially via the LAN 7 and LAN I/F unit 38 according to the test processing sequence RT1 shown in FIG. 6 (SP1).

Eventually, when the control unit 61 receives the test processing execution request from the operation terminal 5 sequentially via the LAN 7 and LAN I/F unit 38 (SP1: YES), it controls the simulated client unit 64 so as to perform mount processing to the server device 3, which will be subject to test processing, based on the test processing execution request and according to the test schedule information storage table (SP2).

Next, the control unit 61 controls the backup/restoration unit 62 so as to perform backup processing such as snapshots or volume replications, for instance, to the logical volume which will be subject to test processing (SP3).

Here, when backup processing is performed to the logical volume which will be subject to test processing, the control unit 61 executes a test schedule processing (described later) based on the received test processing execution request and according to the test schedule information storage table (RT2).

Next, the control unit 61 controls the log creation unit 65 so as to create log information containing the determination result of all failure response verification processing in the test schedule processing once the test schedule processing is complete, and transmits this to the operation terminal 5 sequentially via the LAN I/F unit 38 and LAN 7 (SP4).

Next, the control unit 61 controls the simulated client unit 64 so as to perform the unmount processing from the server device 3 that was subject to the test processing (SP5).

Next, the control unit 61 controls the backup/restoration unit 62 so as to perform restoration processing for restoring the logical volume that was subject to test processing to a status before backup (SP6), and thereafter ends this test processing sequence RT1 (SP7).

Figure 7:
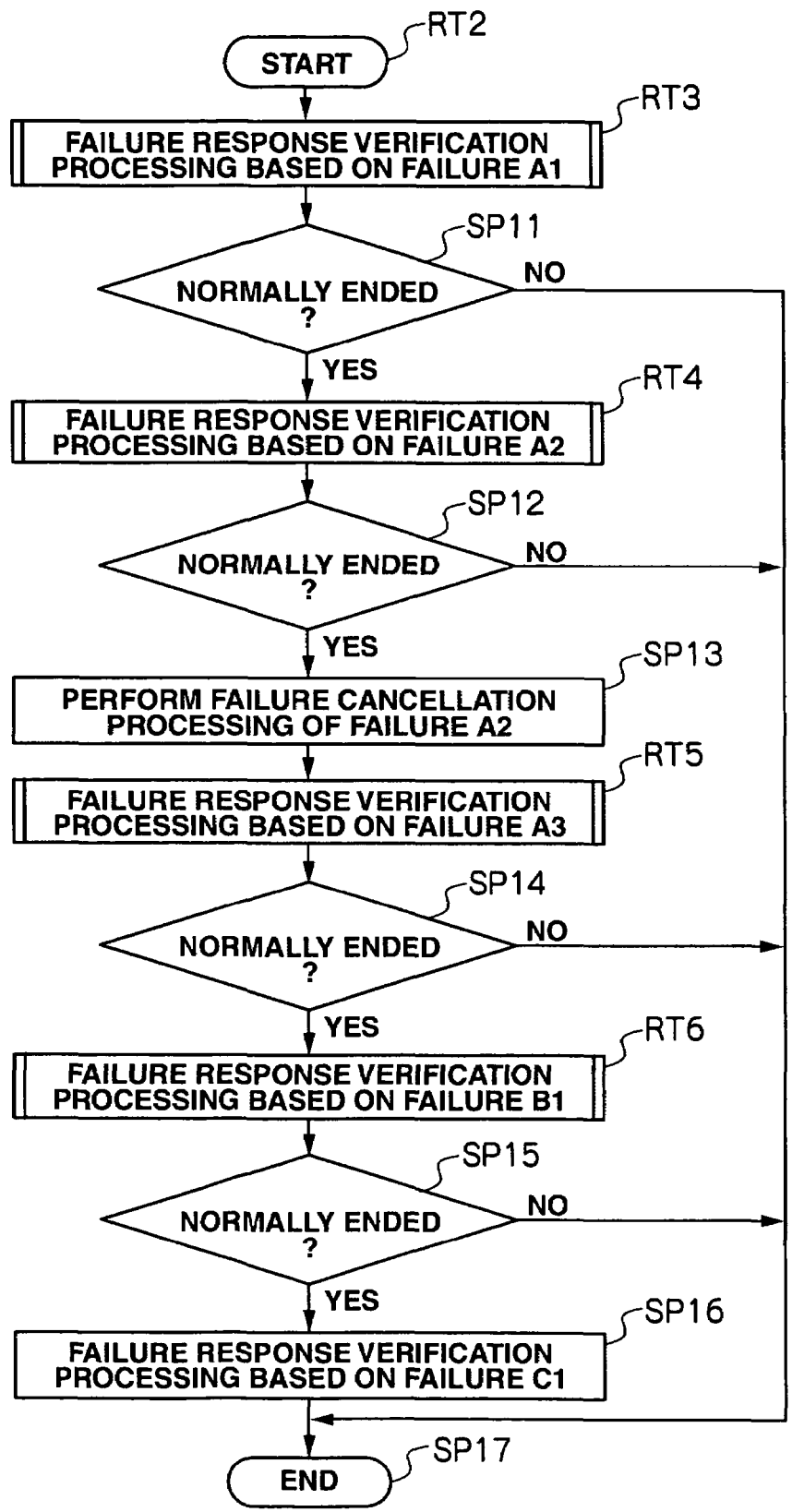
FIG. 7 is a flowchart for explaining the test schedule control processing sequence.

Next, the test schedule processing sequence to be performed in the storage system 1 is explained. FIG. 7 is a flowchart showing the specific processing sequence of the test schedule processing for executing the test schedule stored in the test schedule information storage table 91.

Incidentally, in the present embodiment, although a case is explained where a test processing execution request of the test schedule T1 is received among the test schedules stored in the test schedule information storage table 91, and the test schedule T1 is executed based on the test execution request of the test schedule T1 and according to the test schedule information storage table 91, the present invention is not limited thereto, and test processing may be executed for various test schedules stored in the test schedule information storage table 91.

The control unit 61, at the initial stage, executes failure response verification processing (described later) based on failure A1, which is a failure ID stored at the very beginning in the test schedule storage column 97 of the test schedule information storage table, according to the test schedule processing sequence RT2 shown in FIG. 7 (RT3).

Next, the control unit 61 checks where or not it determined that the server device 3 is normal according to the execution result of the failure response verification processing based on failure A1 (SP11). And, when the control unit 61 does not determine that the server device 3 is normal according to the execution result of the failure response verification processing based on failure A1; that is, when the [control unit 61] determines that the server device 3 is abnormal (SP11: NO), it ends this test schedule processing sequence RT2 (SP17). Contrarily, when the control unit 61 determines that the server device 3 is normal according to the execution result of the failure response verification processing based on failure A1 (SP11: YES), it executes failure response verification processing (described later) based on failure A2, which is a failure ID stored subsequently to failure A1 in the test schedule storage column 97 of the test schedule information storage table 91 (RT4).

Next, the control unit 61 checks where or not it determined that the server device 3 is normal according to the execution result of the failure response verification processing based on failure A2 (SP12). And, when the control unit 61 does not determine that the server device 3 is normal according to the execution result of the failure response verification processing based on failure A2; that is, when the [control unit 61] determines that the server device 3 is abnormal (SP12: NO), it ends this test schedule processing sequence RT2 (SP17). Contrarily, when the control unit 61 determines that the server device 3 is normal according to the execution result of the failure response verification processing based on failure A2 (SP12: YES), it controls the simulated failure generation unit 63 so as to perform the failure cancellation processing for canceling the failure A2 and restoring the [server device 3] to a normal state without any failure (SP13).

Next, the control unit 61 executes failure response verification processing (described later) based on failure A3, which is a failure ID stored subsequently to failure A2 in the test schedule storage column 97 of the test schedule information storage table 91 (RT5).

Next, the control unit 61 checks where or not it determined that the server device 3 is normal according to the execution result of the failure response verification processing based on failure A3 (SP14). And, when the control unit 61 does not determine that the server device 3 is normal according to the execution result of the failure response verification processing based on failure A3; that is, when the [control unit 61] determines that the server device 3 is abnormal (SP14: NO), it ends this test schedule processing sequence RT2 (SP17). Contrarily, when the control unit 61 determines that the server device 3 is normal according to the execution result of the failure response verification processing based on failure A3 (SP14: YES), it executes failure response verification processing (described later) based on failure B1, which is a failure ID stored subsequently to failure A3 in the test schedule storage column 97 of the test schedule information storage table 91 (RT6).

Next, the control unit 61 checks where or not it determined that the server device 3 is normal according to the execution result of the failure response verification processing based on failure B1 (SP15). And, when the control unit 61 does not determine that the server device 3 is normal according to the execution result of the failure response verification processing based on failure B1; that is, when the [control unit 61] determines that the server device 3 is abnormal (SP15: NO), it ends this test schedule processing sequence RT2 (SP17). Contrarily, when the control unit 61 determines that the server device 3 is normal according to the execution result of the failure response verification processing based on failure B1 (SP15: YES), it executes failure response verification processing (described later) based on failure C1, which is a failure ID stored subsequently to failure B1 in the test schedule storage column 97 of the test schedule information storage table 91 (SP16).

Here, the control unit 61 is able to generate a transmission frame failure by controlling the simulated failure generation unit 63 in the failure response verification processing based on failure C1. The control unit 61 controls the simulated client unit 64 so as to create a data read request and transmits this to the server device 3 sequentially via the LAN I/F unit 38 and LAN 6.

Further, when the control unit 61 is given a data read request from the server device 3 sequentially via the SAN 8, frontend I/F unit 32 and data controller 33, it stores the data to be read corresponding to the [data] read request in the cache memory 34 (FIG. 1).

Further, the control unit 61 uses the failure data stored in the used failure data storage column 86 of the failure information storage table 81 to change the data to be read. Then, the control unit 61 transmits data that is different from the changed data to be read to the server device 3.

And, the control unit 61 is thereby able to verify the setting of the server device regarding the response to a failure based on how the server device 3 will respond to the data that it received which is different from the changed data to be read.

For example, when the server device 3 is set to perform retry processing upon receiving data that is different from the data to be read, the control unit 61 determines that the server device 3 is normal when the server device 3 performs retry processing and transmits a [data] read request, and such [data] read request is received by the control unit 61. Contrarily, when the server device 3 does not perform retry processing and the simulated client unit 64 receives data that is different from the data to be read sequentially via the LAN 6 and LAN I/F unit 38 as is, the control unit 61 determines that the server device 3 is abnormal.

Eventually, when the failure response verification processing based on failure C1 is ended, the control unit 61 ends this test schedule processing sequence RT2 (SP17).

Figure 8:
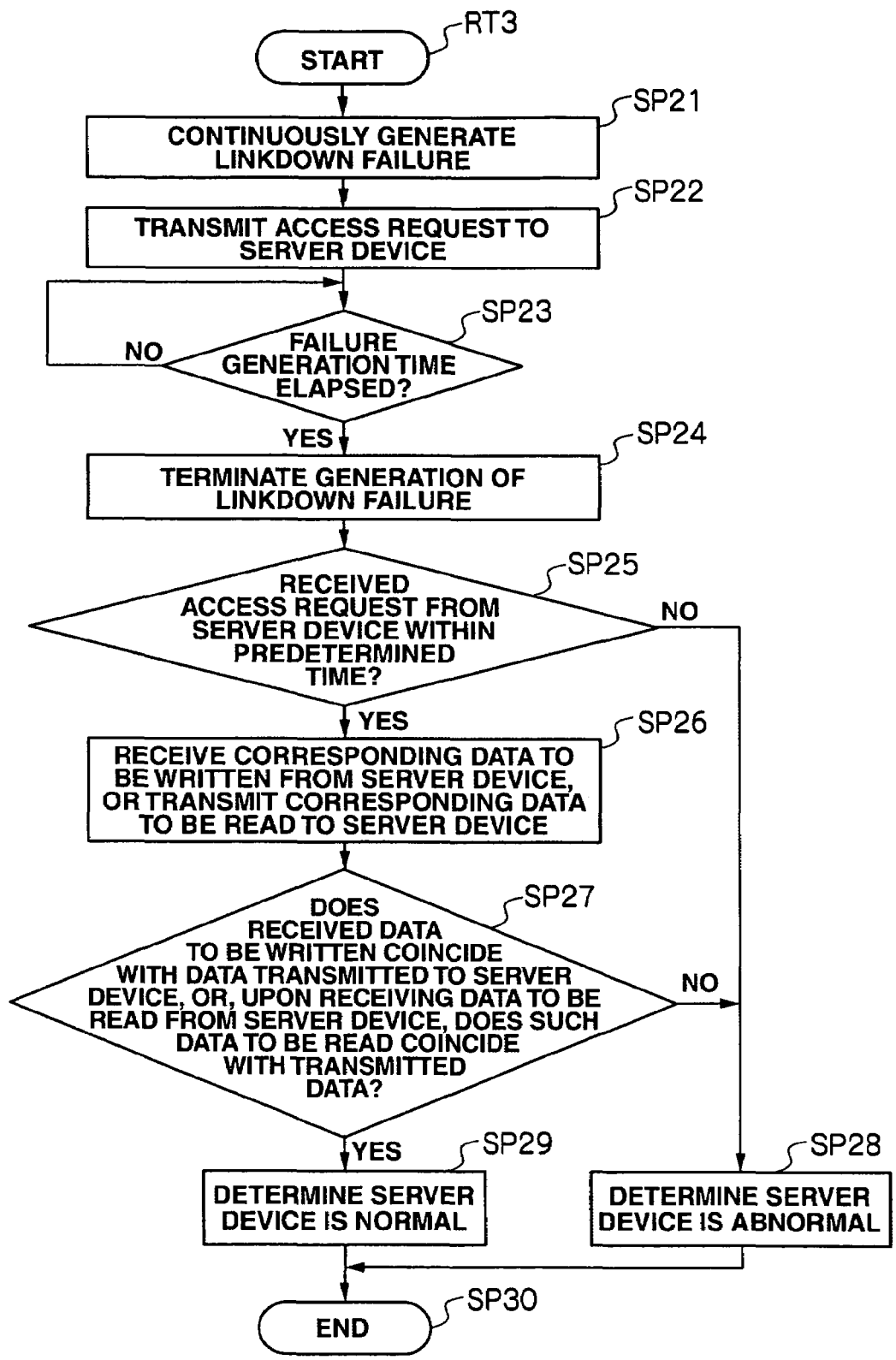
FIG. 8 is a flowchart for explaining the failure response verification processing sequence based on failure A1.

Next, the failure response verification processing sequence based on failure A1 to be performed in the storage system 1 is explained. FIG. 8 is a flowchart showing the specific processing sequence of the failure response verification processing based on failure A1 for verifying the setting of the server device 3 regarding the response to failure A1 based on failure A1 stored in the failure information storage table 81.

Here, for instance, let it be assumed that if the server device 3 does not complete the processing within 20 (sec) upon receiving the access request, an error response is transmitted to the simulated client unit 64, and retry processing is to be performed during that time. Further, let it be assumed that the failure generation time in failure A1 of the failure information storage table 81 or the failure generation time stored in the interval storage column 85 is set to 10 (sec).

The control unit 61, at the initial stage, controls the simulated failure generation unit 63 so as to continuously generate a linkdown failure in the frontend I/F unit 32 during the failure generation time of 10 (sec) according to the failure response verification processing sequence RT3 based on failure A1 shown in FIG. 8 (SP21). Here, specifically, the simulated failure generation unit 63 disables the communication with the server device 3 by blocking the light of the signal line between the server device 3 and frontend I/F unit 32.

Next, the control unit 61 controls the simulated client unit 64 so as to create an access request and transmit this access request to the server device 3 (SP22).

Next, the control unit 61 waits in standby mode until the failure generation time in failure A1 of the failure information storage table 81 or the failure generation time stored in the interval storage column 85 elapses (SP23). Eventually, when the failure generation time in failure A1 of the failure information storage table 81 or the failure generation time stored in the interval storage column 85 elapses (SP23: YES), the control unit 61 controls the simulated failure generation unit 63 so as to cancel the generation of the linkdown failure in the frontend I/F unit 32 (SP24).

Next, the control unit 61 checks whether an access request was received from the server device 3 within a predetermined time (SP25). And, when the control unit 61 did not receive an access request from the server device 3 within a predetermined time (SP25: NO), it determines that the server device 3 is not performing the processing set as the response to the failure A1; that is, it determines that the server device 3 is abnormal (SP28).

Here, when the server 3 does not complete the processing within 20 (sec) upon receiving the access request, since the control unit 61 is set to transmit an error response to the simulated client unit 64 and perform retry processing during that time, and the failure generation time is set to 10 (sec), for instance, the [control unit 61] determines that the server device 3 is abnormal when the simulated client unit 64 receives an error response during a linkdown failure, or when the control unit 61 does not receive the access request even after the linkdown failure is cancelled.

Incidentally, by changing the setup time from the time the server device 3 receives the access request until an error response is transmitted to the simulated client unit 64, or changing the failure generation time in failure A1 of the failure information storage table 81 or the failure generation time stored in the interval storage column 85, for example, it is also possible to contrarily determine that the server device 3 is normal when the simulated client unit 64 receives the error response during a linkdown failure, and various other types of failure response verification processing may be executed.

Meanwhile, when the control unit 61 receives an access request from the server device 3 within a predetermined time (SP25: YES), in a case when the access request is a data write request, it writes the data to be written received from the server device 3 in the physical disk 42 as described above in the flow of input and output of data (SP26).

Next, the control unit 61 reads the test data to be written stored in the memory 37 transmitted by the simulated client unit 64, and checks whether it coincides with the data to be written received from the server device 3 (SP27). And, when the test data to be written stored in the memory 37 transmitted by the simulated client unit 64 and the data to be written received from the server device 3 do not coincide (SP27: NO), the control unit 61 determines that the server device 3 is abnormal (SP28). Contrarily, when the test data to be written stored in the memory 37 transmitted by the simulated client unit 64 and the data to be written received from the server device 3 coincide (SP27: YES), control unit 61 determines that the server device 3 is normal (SP29), and thereafter ends the failure response verification processing sequence RT3 based on failure A1 (SP30).

Meanwhile, the control unit 61, in a case where the access request is a data read request, reads the data to be read corresponding to such data read request from the physical disk 42 and transmits this to the server device 3 as described above in the flow of input and output of data (SP26).

Next, the control unit 61 checks whether the data to be read from the server device 3 received by the simulated client unit 64 coincides with the data to be read from the physical disk 42 and corresponding to the data read request received from the server device 3 (SP27). And, when the data to be read from the server device 3 received by the simulated client unit 64 and the data to be read from the physical disk 42 and corresponding to the data read request received from the server device 3 do not coincide (SP27: NO), the control unit 61 determines that the server device 3 is abnormal (SP28). Contrarily, when the data to be read from the server device 3 received by the simulated client unit 64 and the data to be read from the physical disk 42 and corresponding to the data read request received from the server device 3 coincide (SP27: YES), control unit 61 determines that the server device 3 is normal (SP29), and thereafter ends the failure response verification processing sequence RT3 based on failure A1 (SP30).

Figure 9:
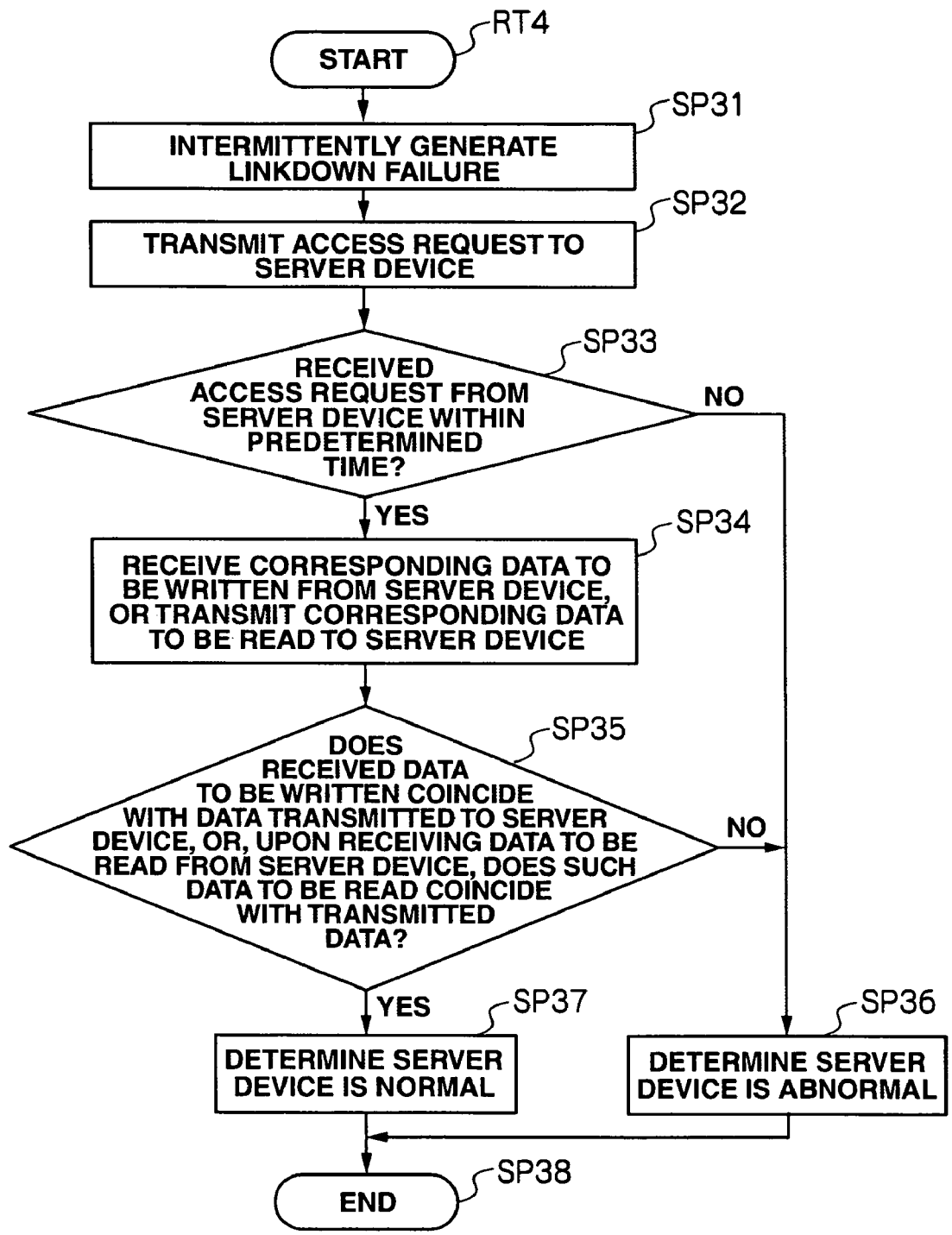
FIG. 9 is a flowchart for explaining the failure response verification processing sequence based on failure A2.

Next, the failure response verification processing sequence based on failure A2 to be performed in the storage system 1 is explained. FIG. 9 is a flowchart showing the specific processing sequence of the failure response verification processing based on failure A2 for verifying the setting of the server device 3 regarding the response to failure A2 based on failure A2 stored in the failure information storage table 81.

Here, for instance, let it be assumed that if the server device 3 does not complete the processing within 20 (sec) upon receiving the access request, an error response is transmitted to the simulated client unit 64, and retry processing is to be performed during that time. Further, let it be assumed that the failure generation time in failure A2 of the failure information storage table 81 or the failure generation time stored in the interval storage column 85 is set to 1 (sec). Moreover, in the case of the foregoing setting, let it be assumed that the server device 3 is able to complete the transmission and reception of data even though there may be a slight influence on such transmission and reception of data.

The control unit 61, at the initial stage, controls the simulated failure generation unit 63 so as to intermittently generate a linkdown failure in the frontend I/F unit 32 during the failure generation time of 1 (sec) according to the failure response verification processing sequence RT4 based on failure A2 shown in FIG. 9 (SP31). Here, specifically, the simulated failure generation unit 63 disables the communication with the server device 3 by blocking and unblocking the light of the signal line between the server device 3 and frontend I/F unit 32.

Next, the control unit 61 controls the simulated client unit 64 so as to create an access request and transmit this access request to the server device 3 (SP32).

Next, the control unit 61 checks whether an access request was received from the server device 3 within a predetermined time (SP33). And, when the control unit 61 did not receive an access request from the server device 3 within a predetermined time (SP33: NO), it determines that the server device 3 is not performing the processing set as the response to the failure A2; that is, it determines that the server device 3 is abnormal (SP36).

Here, when the server 3 does not complete the processing within 20 (sec) upon receiving the access request, if the control unit 61 is set to transmit an error response to the simulated client unit 64 and perform retry processing during that time, since the transmission and reception of data can be completed even though there will a slight influence on such transmission and reception of data, for instance, the [control unit 61] determines that the server device 3 is abnormal when the simulated client unit 64 receives an error response during the intermittent linkdown failure.

Incidentally, by changing the setup time from the time the server device 3 receives the access request until an error response is transmitted to the simulated client unit 64, or changing the failure generation time in failure A2 of the failure information storage table 81 or the failure generation time stored in the interval storage column 85, for example, it is also possible to contrarily determine that the server device 3 is normal when the simulated client unit 64 receives the error response during the intermittent linkdown failure, and various other types of failure response verification processing may be executed.

Meanwhile, when the control unit 61 receives an access request from the server device 3 within a predetermined time (SP33: YES), it thereafter executes processing similar to SP26 to SP29 (SP34 to SP37), and then ends the failure response verification processing sequence RT4 based on failure A2 (SP38).

Figure 10:
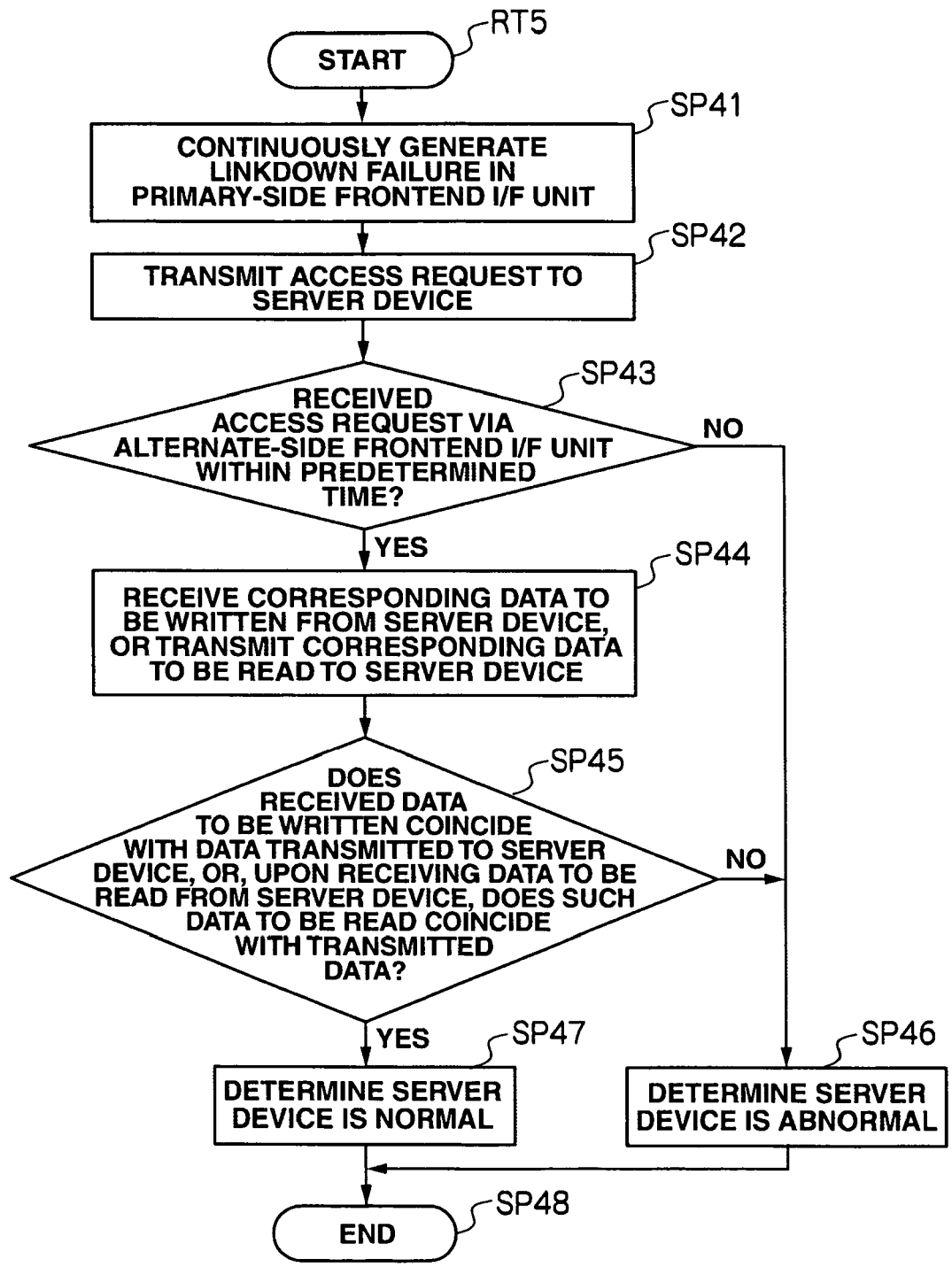
FIG. 10 is a flowchart for explaining the failure response verification processing sequence based on failure A3.

Next, the failure response verification processing sequence based on failure A3 to be performed in the storage system 1 is explained. FIG. 10 is a flowchart showing the specific processing sequence of the failure response verification processing based on failure A3 for verifying the setting of the server device 3 regarding the response to failure A3 based on failure A3 stored in the failure information storage table 81.

Here, for instance, let it be assumed that if the server device 3 does not complete the processing within 5 (sec) upon receiving the access request, the input and output of data is switched from the primary-side front end I/F unit 32A to the alternate-side front end I/F unit 32B, and, if the [server device 3] does not complete the processing within 20 (sec), an error response is transmitted to the simulated client unit 64, and retry processing is to be performed during that time. Further, let it be assumed that the failure generation time in failure A3 of the failure information storage table 81 or the failure generation time stored in the interval storage column 85 is set to 30 (sec).

The control unit 61, at the initial stage, controls the simulated failure generation unit 63 so as to continuously generate a linkdown failure in the primary-side front end I/F unit 32A only during the failure generation time of 30 (sec) according to the failure response verification processing sequence RT5 based on failure A3 shown in FIG. 10 (SP41). Here, specifically, the simulated failure generation unit 63 disables the communication with the server device 3 by blocking the light of the signal line between the server device 3 and primary-side front end I/F unit 32A.

Next, the control unit 61 controls the simulated client unit 64 so as to create an access request and transmit this access request to the server device 3 (SP42).

Next, the control unit 61 checks whether an access request was received from the server device 3 via the alternate-side front end I/F unit 32B within a predetermined time (SP43). And, when the control unit 61 did not receive an access request from the server device 3 via the alternate-side front end I/F unit 32B within a predetermined time (SP43: NO), it determines that the server device 3 is not performing the processing set as the response to the failure A3; that is, it determines that the server device 3 is abnormal (SP46).

Here, since the control unit 61 is set to switch the input and output of data from the primary-side front end I/F unit 32A to the alternate-side front end I/F unit 32B when the server 3 does not complete the processing within 5 (sec) upon receiving the access request, and set to transmit an error response to the simulated client unit 64 and perform retry processing during that time if the [server device 3] does not complete the processing within 20 (sec), for instance, the [control unit 61] determines that the server device 3 is abnormal when the simulated client unit 64 receives an error response during the linkdown failure of the primary-side front end I/F unit 32A.

Incidentally, by changing the switching setup time from the time the input and output of data from the primary-side front end I/F unit 32A is switched to the alternate-side front end I/F unit 32B, or the time the server device 3 receives the access request until an error response is transmitted to the simulated client unit 64, or changing the failure generation time in failure A3 of the failure information storage table 81 or the failure generation time stored in the interval storage column 85, for example, it is also possible to contrarily determine that the server device 3 is normal when the simulated client unit 64 receives the error response during the linkdown failure of the primary-side front end I/F unit 32A, and various other types of failure response verification processing may be executed.

Meanwhile, when the control unit 61 receives an access request from the server device 3 within a predetermined time (SP43: YES), it thereafter executes processing similar to SP26 to SP29 (SP44 to SP47), and then ends the failure response verification processing sequence RT5 based on failure A3 (SP48).

Figure 11:
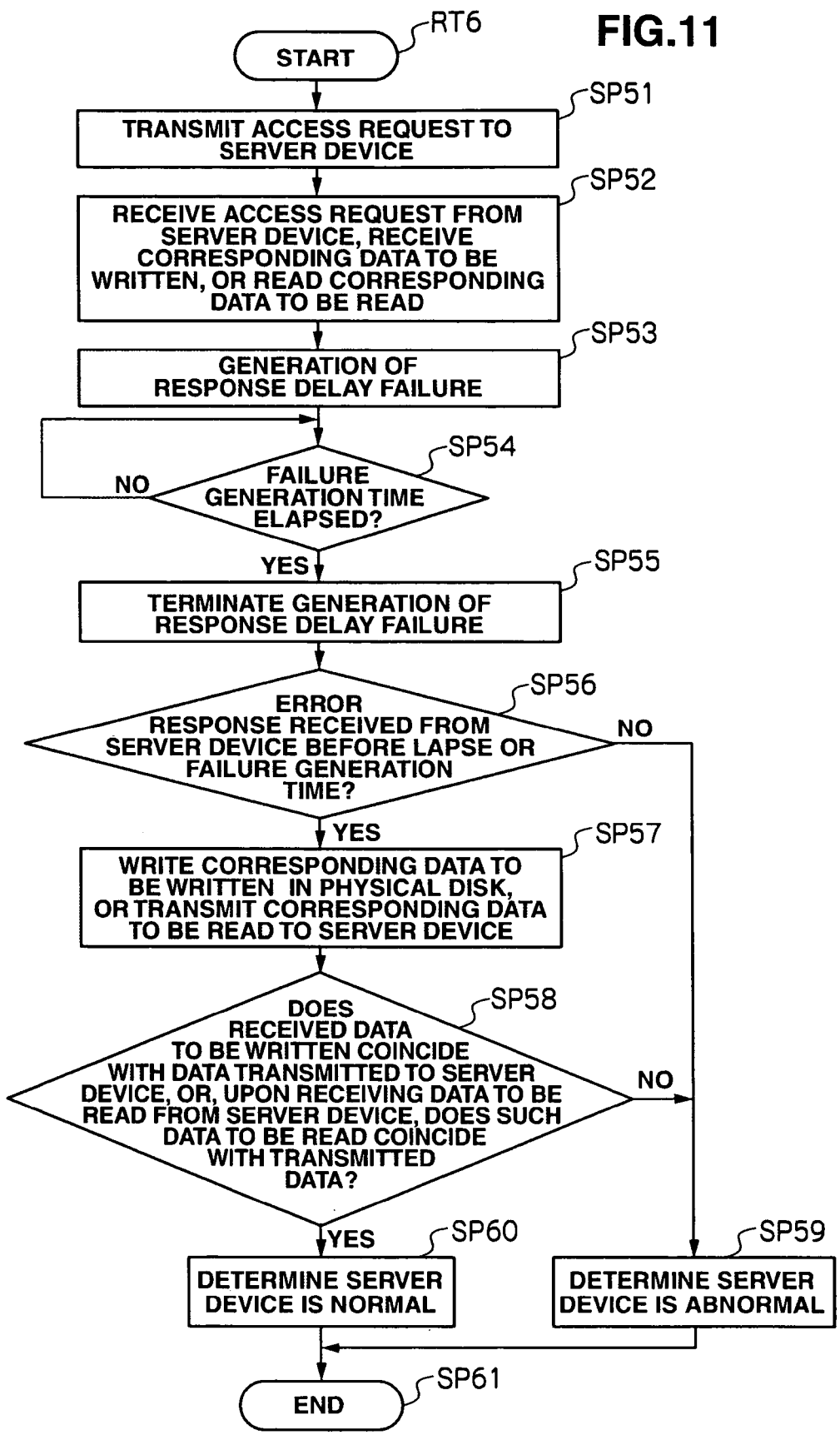
FIG. 11 is a flowchart for explaining the failure response verification processing sequence based on failure B1.

Next, the failure response verification processing sequence based on failure B1 to be performed in the storage system 1 is explained. FIG. 11 is a flowchart showing the specific processing sequence of the failure response verification processing based on failure B1 for verifying the setting of the server device 3 regarding the response to failure B1 based on failure B1 stored in the failure information storage table 81.

Here, for instance, let it be assumed that if the server device 3 does not complete the processing within 20 (sec) after transmitting the access request to the disk array device 4, an error response is transmitted to the simulated client unit 64 as a response delay, and standby processing is to be performed during that time. Further, let it be assumed that the failure generation time in failure B1 of the failure information storage table 81 or the failure generation time stored in the interval storage column 85 is set to 15 (sec).

The control unit 61, at the initial stage, controls the simulated failure generation unit 64 so as to create an access request and transmit such access request to the server device 3 according to the failure response verification processing sequence RT6 based on failure B1 shown in FIG. 11 (SP51).

Next, when the control unit 61 receives an access request from the server device 3 and such access request is a data write request, as explained above in the flow of input and output of data, the data to be written from the server device 3 is received in the frontend I/F unit 32, and, when such access request is a data read request, the [control unit 61] reads the data to be read corresponding to the data read request from the physical disk 42 and transmits it to the frontend I/F unit 32 (SP52).

Next, the control unit 61 controls the simulated failure generation unit 63 so as to generate a response delay failure for the failure generation time of 15 (sec) (SP53). Here, the simulated failure generation unit 63 keeps the data to be written and data to be read in standby for the length of the failure generation time in the frontend I/F unit 32.

Next, the control unit 61 waits in standby mode until the failure generation time in failure B1 of the failure information storage table 81 or the failure generation time stored in the interval storage column 85 elapses (SP54). Eventually, when the failure generation time in failure B1 of the failure information storage table 81 or the failure generation time stored in the interval storage column 85 elapses (SP54: YES), the control unit 61 controls the simulated failure generation unit 63 and cancels the generation of the response delay failure (SP55).

Next, the control unit 61 checks whether an error response was received from the server device 3 before the lapse of the failure generation time (SP56). And, when the control unit 61 did not receive an error response from the server device 3 before the lapse of the failure generation time (SP56: NO), it determines that the server device 3 is not performing the processing set as the response to the failure B1; that is, it determines that the server device 3 is abnormal (SP59).

Here, since the control unit 61 is set to transmit an error response as a response delay to the simulated client unit 64 when 20 (sec) elapses from the time the server 3 transmits an access request to the disk array device 4, and perform retry processing during that time, for instance, the [control unit 61] determines that the server device 3 is abnormal when the simulated client unit 64 receives an error response during the response delay failure.

Incidentally, by changing the response delay standby setup time from the time the server device 3 transmits the access request to the disk array device 4 until standby processing is performed, or changing the failure generation time in failure B1 of the failure information storage table 81 or the failure generation time stored in the interval storage column 85, for example, it is also possible to contrarily determine that the server device 3 is normal when the simulated client unit 64 receives the error response during the response delay failure, and various other types of failure response verification processing may be executed.

Contrarily, when the control unit 61 did not receive an error response from the server device 3 in the simulated client unit 64 before the lapse of the failure generation time (SP56: NO), in the case when the access request is a data write request, it writes the data to be written corresponding to the [data] write request in the physical disk 42 on the one hand, and, in the case when the access request is a data read request, it transmits the data to be read corresponding to the [data] read request to the server device 3 on the other hand (SP57).

Next, the control unit 61 thereafter executes processing similar to SP26 to SP29 (SP58 to SP60), and then ends the failure response verification processing sequence RT6 based on failure B1 (SP61).

(1-4) Test Schedule Setting Form

Next, the test schedule setting form in the storage system 1 is explained. The storage system 1 according to the present embodiment is characterized in that it selects a failure stored in the failure information storage table 81, sets a test schedule for setting which failure among the failures is to be generated in what sequence, and verifies the setting of the server device 3 regarding the response to the failure in the foregoing sequence.

Figure 12:
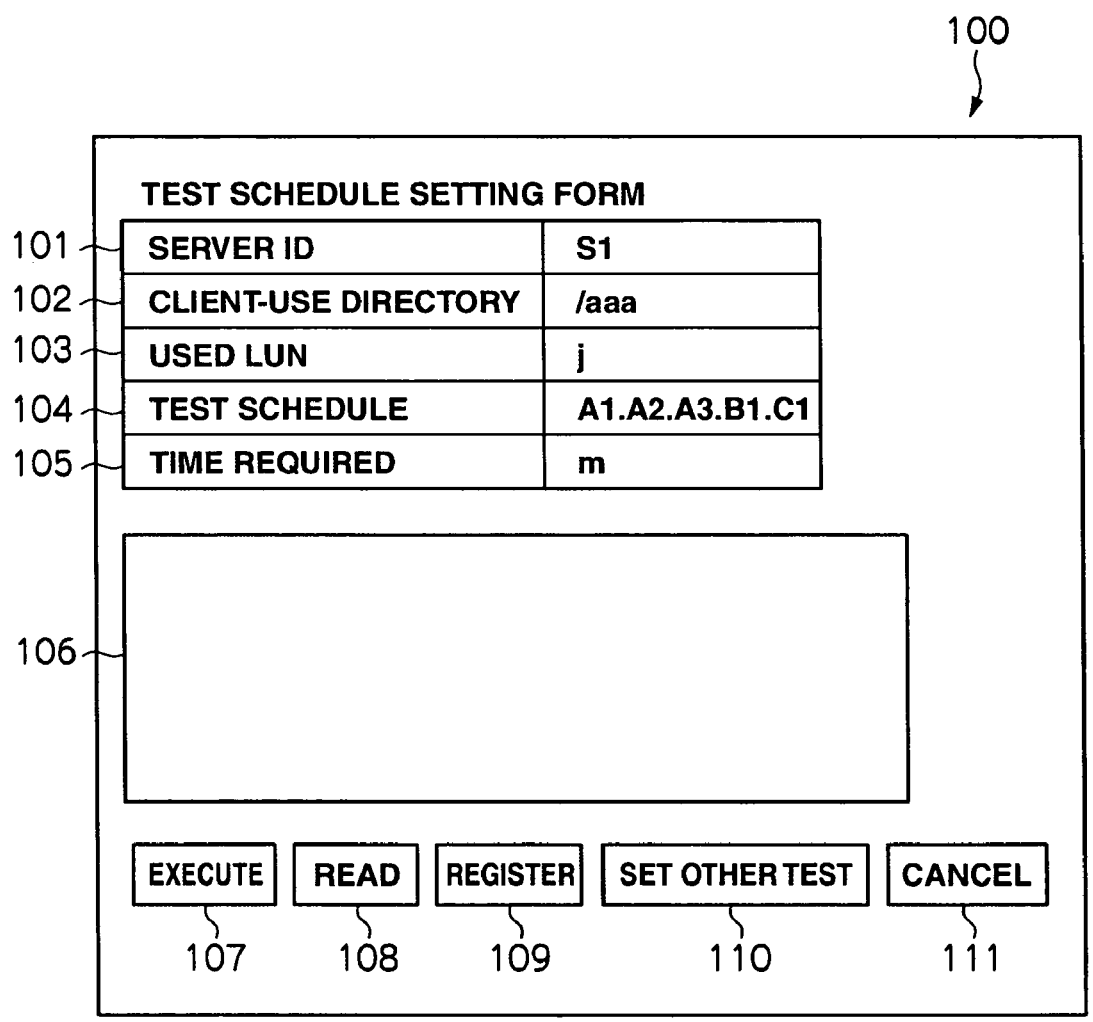
FIG. 12 is a conceptual diagram for explaining the test schedule setting form.

The operation terminal 5, for instance, displays the test schedule setting form 100 shown in FIG. 12 on a display unit of the operation terminal 5 with a GUI (Graphical User Interface) according to the maintenance worker's operation of the operating unit (not shown), and based on the various control programs stored in the memory 37.

This test schedule setting form 100 has a server ID input column 101 for selecting a server ID, a client-use directory storage column 102 storing a client-use directory corresponding to the input of the server ID, a used LUN input column 103 for inputting the LUN to be used, a test schedule input column 104 for inputting the test schedule, a time required input column 105 for inputting the time required in the test schedule, and a display column 106 for displaying the server information storage table 71, failure information storage table 81 and test schedule storage table 91 transmitted from the disk array device 4.

Further, this test schedule setting form 100 has an execution button 107 for executing the test processing, a read button 108 for reading the test schedule storage table 91, a registration button 109 for registering the various input parameters as the test schedule, another test setting button 110 for registering the test schedule and setting another test schedule, and a cancel button 111 for canceling the various input parameters.

When the server ID input column 101 is selected according to the maintenance worker's operation of the operating unit (not shown), the operation terminal 5 transmits a server information storage table transmission request to the control unit 61 of the disk array device 4. The control unit 61 of the disk array device 4 transmits the server information storage table 71 to the operation terminal 5 according to the server information storage table transmission request. Thereby, the server information storage table 71 is displayed on the display column 106 of the test schedule setting form 100.

Further, when the server ID input column 101 is input according to the server information storage table 71 based on the maintenance worker's operation of the operating unit (not shown), the operation terminal 5 stores the corresponding client-use directory in the client-use directory storage column 102.

Moreover, when the used LUN input column 103 is selected according to the maintenance worker's operation of the operating unit (not shown), the operation terminal 5 transmits a LUN information transmission request to the control unit 61 of the disk array device. The control unit 61 of the disk array device 4 transmits the LUN information to the operation terminal 5 according to the LUN information transmission request. Thereby, the LUN information is displayed on the display column 106 of the test schedule setting form 100. And, the operation terminal 5 inputs the LUN to be used in the used LUN input column 103 according to the LUN information.

Further, when the test schedule input column 104 is selected, the operation terminal 5 transmits a failure information storage table transmission request to the control unit 61 of the disk array device 4. The control unit 61 of the disk array device 4 transmits the failure information storage table 81 to the operation terminal 5 according to the failure information storage table transmission request. Thereby, the failure information storage table 81 is displayed on the display column 106 of the test schedule setting form 100. And, the operation terminal 5 sequentially inputs a failure ID for verifying the setting of the server device 3 regarding the response to a failure based on the maintenance worker's operation of the operating unit (not shown) and according to the failure information storage table 81.

Further, the operation terminal 5 inputs the overall time required in the test processing in the time required input column 105 according to the maintenance worker's operation of the operating unit (not shown).

And, when the server ID input column 101, client-use directory storage column 102, used LUN input column 103, test schedule input column 104 and time required input column 105 are input and the registration button 109 is pressed, the operation terminal 5 gives a test schedule ID and respectively stores the various parameters in the corresponding storage columns of the test schedule storage information table 91. Thereby, the maintenance worker will be able to set various test schedules of one's intention, and verify the setting of the server device 3 regarding the response to a failure according to this test schedule.

(1-5) Test Processing Execution Display Form

Next, the test processing execution display form in the storage system 1 is explained. The storage system 1 according to the present embodiment is characterized in that it displays the execution status of the test processing on the display unit of the operation terminal 5 when the operation terminal 5 is operated and the test processing is executed.

When the read button 108 is pressed according to the maintenance worker's operation of the operating unit (not shown), the operation terminal 5 transmits a test schedule information storage table transmission request to the control unit 61 of the disk array device 4. The control unit 61 of the disk array device 4 transmits the test schedule information storage table 91 to the operation terminal 5 according to the test schedule information storage table transmission request. Thereby, the test schedule information storage table 91 is displayed on the display column 106 of the test schedule setting form 100.

And, when a desired test schedule ID of the test schedule information storage table 106 displayed on the display column 106 is pressed with the operation terminal 5, for instance, the various parameters stored in the test schedule ID are input to the server ID input column 101, client-use directory storage column 102, used LUN input column 103, test schedule input column 104 and time required input column 105.

Here, when the execution button 107 of the test schedule setting form 100 is pressed, the operation terminal 5, for instance, transmits a test processing execution request to the disk array device 4. Thereby, the control unit 61 of the disk array device 4 starts the test processing as described above.

Here, in substitute for the test schedule setting form 100, the operation terminal 5 displays the test processing execution status display form 121 shown in FIG. 13 on the display unit of the operation terminal 5 ⁰display unit.

This test processing execution status display form 121 has a server ID display column 122 displaying the various parameters stored in the executed test schedule ID, a client-use directory display column 123, a used LUN display column 124, a test schedule display column 125, a time required display column 126, and an execution status display column 127 displaying the test schedule and execution status.

This test processing execution status display form 121 has a cancel button 128 for canceling the test processing. Here, with the execution status display column 127, the maintenance worker will be able to distinguish, at a glance, which failure response verification processing has ended, which failure response verification processing is being executed, and which failure response verification processing has not yet been executed. Further, the [maintenance worker] is also able to distinguish, at a glance, whether the failure response verification processing has ended normally, or whether it ended abnormally.

Further, this test processing execution status display form 121 has a log output button 129, in substitute for the cancel button, for outputting log information after the test processing is ended, and an end button 130 for ending the test processing execution status display form.

Here, when the log output button 129 is pressed according to the maintenance worker's operation of the operating unit (not shown), the operation terminal 5 transmits a log information transmission request to the control unit 61 of the disk array device 4. The control unit 61 of the disk array device 4 controls the log creation unit 65 so as to create log information in the test processing and transmits this to the operation terminal 5 according to the log information transmission request. Thereby, the log output form 131 shown in FIG. 15 is displayed on the display unit of the operation terminal 5.

This log output form 131 displays a log output L1 showing the log output and determination result of the failure response verification processing based on failure A1, a log output L2 showing log output and determination result of the failure response verification processing based on failure A2, a log output L3 showing log output and determination result of the failure response verification processing based on failure A3, a log output L4 showing log output and determination result of the failure response verification processing based on failure A4, and a log output L5 showing log output and determination result of the failure response verification processing based on failure A5. Thereby, the maintenance worker will be able to easily recognize the results of the test processing.

Thus, with this storage system 1, by generating a simulated failure in the disk array device 4, creating an access request to be transmitted by the client device 2 to the server device 3 via the LAN 6, and verifying the setting of the server device 3 regarding the response to a failure in a state when such failure is being generated, without having to install any new test program in the server device 3, it will be possible to verify the setting of the server device 3 regarding the response to a failure, and to verify the setting of the server device 3 regarding the response to a failure in the environment of the actual storage system 1. Thus, the setting of a server device regarding the response to a failure can be easily verified.

Further, with this storage system 1, a maintenance worker does not have to verify the setting of the server device and disk array device by inserting and removing the path or the like in order to verify the connectability between the setting server device and disk array device or the setting regarding the response or path switching upon a failure, and the setting of the server device regarding the setting to a failure can be automatically verified.

Further, this storage system 1 is able to verify the setting of the server device 3 regarding the response to a failure in the actual environment of the storage system 1 while effectively preventing the damage to the data during test processing by performing backup processing of reproducing snapshots or volumes in the logical volume to be subject to the test processing, and performing restoration processing for restoring the logical volume that was subject to test processing to the logical volume that was subject to the backup processing.

Further, in the present embodiment described above, although a case is explained where the series of processing steps is executed with hardware having the respective functions, the present invention is not limited thereto, and such processing steps may also be executed with software. Here, when causing software to execute the series of processing steps, by installing various programs in a computer with built-in hardware dedicated to the programs constituting such software, it will be possible to execute the various functions, and, for instance, programs can be installed from a recording medium. As such a recording medium, for example, an optical disk, optical-magneto disk, semiconductor memory, magnetic disk or other types of recording mediums may be used as a matter of course. Moreover, for instance, various programs may be installed by downloading them via a network such as the Internet.

The present invention may be widely employed in various types of disk array devices that read and write data based on an access request transmitted from a client device via a server device.

What is claimed is:

1. A disk array device having at least one volume from/to which data is read/written based on an access request transmitted from a first client device via a server device and a storage area network (SAN), the disk array device comprising:
   a failure generation unit for generating a simulated internal failure of said disk array device;
   an access request transmission unit simulating as a second client device for creating a simulated access request as if issued from the second client device and transmitting the simulated access request from said disk array device to said server device via a local area network (LAN), the simulated access request being a write or read request for accessing data stored in said disk array device via the LAN, the server device and the SAN; and
   a verification unit for verifying a setting of said server device for a response to said simulated internal failure based on comparison data, stored in the disk array device and corresponding to the simulated access request transmitted from said access request transmission unit simulating as the second client device in a state that said simulated internal failure is being generated by said failure generation unit, with a response of said server device to the simulated access request transmitted from said access request transmission unit simulating as the second client device.

2. The disk array device according to claim 1, wherein said failure generation unit generates a linkdown failure that disables the communication between said server device and said disk array device for a predetermined time; and wherein said verification unit verifies the setting of said server device regarding the response to said linkdown failure based on the response of said server during said linkdown failure and the response of said server device after said linkdown failure.

3. The disk array device according to claim 1, wherein said failure generation unit generates an intermittent linkdown failure that disables the communication between said server device and said disk array device intermittently; and wherein said verification unit verifies the setting of said server device regarding the response to said intermittent linkdown failure based on the response of said server device during said intermittent linkdown failure.

4. The disk array device according to claim 1, wherein said failure generation unit generates a main interface linkdown failure that disables the communication only between said server device and a main interface of said disk array device; and wherein said verification unit verifies the setting of said server device regarding the response to said main interface linkdown failure based on the response of said server device during said main interface linkdown failure.

5. The disk array device according to claim 1, wherein said failure generation unit generates a response delay failure that delays the reading and writing of said data at said disk array device for a predetermined time; and wherein said verification unit verifies the setting of said server device regarding the response to said response delay failure based on the response of said server device during said response delay failure and the response of said server device after said response delay failure.

6. The disk array device according to claim 1, wherein said failure generation unit generates a plurality of different failures in a prescribed sequence; and wherein said verification unit verifies the setting of said server device regarding the response to each of said plurality of different failures.

7. The disk array device according to claim 1, wherein said verification unit verifies whether the data corresponding to said simulated access request transmitted to said server device and thereafter transmitted from said server device coincides with the data corresponding to the said simulated access request prior to being transmitted to said server device.

8. The disk array device according to claim 1, further comprising a backup/restoration unit for backing up the volume to be executed based on the verification by said verification unit, and restoring the volume verified with said verification unit to the state prior to backup.

9. A failure response verification method executed by a disk array device having at least one volume from/to which data is read/written based on an access request transmitted from a first client device via a server device and a storage area network (SAN), comprising:

a first step of generating a simulated internal failure of said disk array device;

a second step of creating and transmitting a simulated access request transmitted from said disk array device as if issued from a second client device to said server device via a local area network (LAN), the simulated access request being a write or read request for accessing data stored in said disk array device via the LAN, the server device and the SAN; and a third step of verifying a setting of said server device for a response to said simulated internal failure based on comparison data, stored in the disk array device and corresponding to the simulated access request transmitted at said second step in a state that said simulated internal failure is being generated at said first step, with a response of said server device to the simulated access request.

10. The failure response verification method according to claim 9, wherein at said first step, a linkdown failure that disables the communication between said server device and said disk array device is generated for a predetermined time; and wherein at said third step, the setting of said server device regarding the response to said linkdown failure is verified based on the response of said server during said linkdown failure and the response of said server device after said linkdown failure.

11. The failure response verification method according to claim 9, wherein at said first step, an intermittent linkdown failure that disables the communication between said server device and said disk array device is generated intermittently; and wherein at said third step, the setting of said server device regarding the response to said intermittent linkdown failure is verified based on the response of said server device during said intermittent linkdown failure.

12. The failure response verification method according to claim 9, wherein at said first step, a main interface linkdown failure that disables the communication only between said server device and a main interface of said disk array device is generated; and wherein at said third step, the setting of said server device regarding the response to said main interface linkdown failure is verified based on the response of said server device during said main interface linkdown failure.

13. The failure response verification method according to claim 9, wherein at said first step, a response delay failure that delays the reading and writing of said data at said disk array device is generated for a predetermined time; and wherein at said third step, the setting of said server device regarding the response to said response delay failure is verified based on the response of said server device during said response delay failure and the response of said server device after said response delay failure.

14. The failure response verification method according to claim 9, wherein at said first step, a plurality of different failures are generated in a prescribed sequence; and wherein at said third step, the setting of said server device regarding the response to each of said plurality of different failures is verified.

15. The failure response verification method according to claim 9, wherein at said third step, whether the data corresponding to said simulated access request transmitted to said server device and thereafter transmitted from said server device coincides with the data corresponding to said simulated access request prior to being transmitted to said server device is verified.

16. The failure response verification method according to claim 9, further comprising a step of backing up the volume to be executed based on the verification at said third step, and restoring said verified volume to the state prior to backup.

17. The disk array device according to claim 1, wherein said verification unit verifies whether the setting of the server device regarding the response to a failure based upon how the server device responds to a situation that data actually received via the simulated access request is different from a to-be-accessed data indicated in the simulated access request.

18. The disk array device according to claim 17, wherein the server device is set to perform retry processing upon receiving data that is different from the to-be-accessed data, and wherein the server device receives data that is different from the to-be-accessed data, said verification unit either determines that the server device is normal if the server device performs retry processing and transmits a data read request and if the disk array device later receives the data read request via the server device, or determines that the server device is abnormal if the server device does not perform retry processing.

19. The failure response verification method according to claim 9, wherein said third step involves verifying whether the setting of the server device regarding the response to a failure based upon how the server device responds to a situation that data actually received via the simulated access request is different from a to-be-accessed data indicated in the simulated access request.

20. The failure response verification method according to claim 19, further comprising: setting the server device to perform retry processing upon receiving data that is different from the to-be-accessed data; and when the server device receives data that is different from the to-be-accessed data, either determining that the server device is normal if the server device performs retry processing and transmits a data read request and if the disk array device later receives the data read request via the server device, or determining that the server device is abnormal if the server device does not perform retry processing.

\* \* \* \* \*

UNITED STATES PATENT AND TRADEMARK OFFICE
CERTIFICATE OF CORRECTION

PATENT NO. : 7,610,515 B2
APPLICATION NO. : 11/304896
DATED : October 27, 2009
INVENTOR(S) : Kosuge et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 613 days.

Signed and Sealed this

Twelfth Day of October, 2010

David J. Kappos
*Director of the United States Patent and Trademark Office*